United States Patent [19]

Smith

[11] 4,330,714
[45] May 18, 1982

[54] WIND TURBINE SYSTEM

[76] Inventor: Otto J. M. Smith, 612 Euclid Ave., Berkeley, Calif. 94708

[21] Appl. No.: 163,385

[22] Filed: Jun. 26, 1980

[51] Int. Cl.³ .............................................. F03D 7/04
[52] U.S. Cl. ..................................... 290/55; 416/142; 416/196 A
[58] Field of Search ...................... 290/43, 44, 54, 55; 60/398; 416/232–233, 194, 196 A, 193 A, 133, 142 B, 184, DIG. 4

[56] References Cited

U.S. PATENT DOCUMENTS

| | | | |
|---|---|---|---|
| 282,122 | 7/1883 | Schramm | 416/142 B |
| 1,010,749 | 12/1911 | Green | 416/194 |
| 1,334,485 | 3/1920 | Clippell et al. | 290/44 |
| 1,635,840 | 7/1927 | Haw | 416/233 |
| 1,699,949 | 1/1929 | Bucklen | 290/55 |
| 2,832,895 | 4/1958 | Hutter | 290/44 |
| 4,213,737 | 7/1980 | Gerhardt | 416/193 R |

FOREIGN PATENT DOCUMENTS 114970 5/1926 Switzerland ............................ 416/4

*Primary Examiner*—J. V. Truhe
*Assistant Examiner*—Shelley Wade
*Attorney, Agent, or Firm*—Flehr, Hohbach, Test, Albritton & Herbert

[57] ABSTRACT

A wind turbine system utilizes a bicycle wheel type turbine having airfoils mounted on various spoke pairs. The vertical yaw axis lies in the horizontal projection of the airfoils to offer better control of the system; for example, automatic stowage in the case of excessive wind is provided since the superstructure of the turbine provides a torque around the vertical yaw axis which moves the wheel into a stowed position. At the same time, the wheel diameter can be made larger and thus heavier since the drive connection to the generator also helps support the weight of the wheel, since it is a rim drive. Greater electrical generation is also provided since an air scoop facing into the wind allows the effective generator capacity to be increased with air velocity. Lastly, the radial rate of change of the angle of the airfoils can be closely controlled.

12 Claims, 9 Drawing Figures

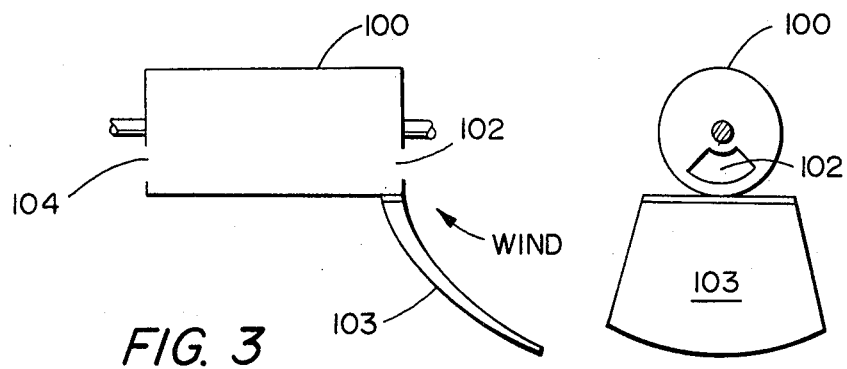
FIG. 3
FIG. 4
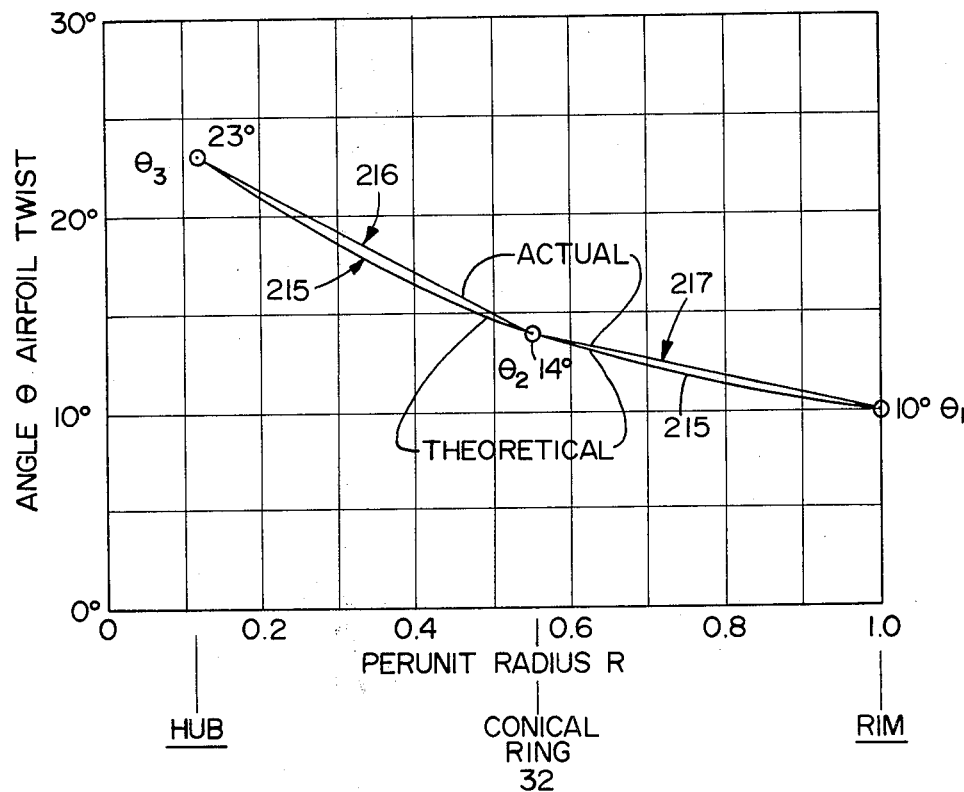
FIG. 5

WIND TURBINE SYSTEM

The present invention is directed to a wind turbine system and more specifically to a multi-bladed giant bicycle-wheel wind turbine which is placed on a tower on which it turns to face into the wind.

The use of airfoils on the spokes of a bicycle-like wind turbine wheel has been attempted in many different forms as explained in Chalk U.S. Pat. No. 3,942,839. Although not shown in this particular patent, in such a design the wheel is on a cantilevered shaft with the rear shaft bearing mounted above a vertical axis yaw bearing which allows the wheel to turn its face into the wind. In other words, the axis of yaw rotation is behind the plane of the turbine blades. The tail on the rotatable platform or support structure tends to keep the turbine blades upwind.

In many other wind turbine designs for pumping water and also for generating electricity, propeller blades are mounted on a horizontal shaft. Since the turbine axle is normally cantilevered there is no axle bearing in front of the turbine. Power is taken off by a gear box or a crankshaft or a reciprocating pump which is located near the rear shaft bearing.

In some recent designs, a rotating generator housing is mounted on top of a fixed tower. On the downwind side of the generator housing is a protruding shaft which has the turbine blades mounted in a cantilevered fashion downwind from the housing. There is no shaft bearing downwind from the turbine in these designs because of the cantilevered nature of the design which is the reverse of the above design.

It is a general object of the present invention to provide a more efficient and better operating wind turbine system.

In accordance with the above objects there is provided a wind turbine system comprising a turbine wheel with a substantially horizontal axle and including an exterior rim with air foils mounted between the rim and the axle. A pair of axle bearings support the wheel for rotation when acted upon by the wind. These bearings lie on opposite sides of a projection of the air foils onto a plane through the wheel axle. On a rigid structure fixed to the ground there is mounted a rotatable supporting base which is rotatable around a vertical yaw axis. The base supports the pair of axle bearings so that the vertical yaw axis passes through a horizontal plane through the horizontal axle substantially between the pair of axle bearings.

With respect to the wind turbine wheel itself, this includes an exterior rim, an axle with hubs, and flexible tensioned spokes between the rim and a first hub. Pairs of flexible tensioned spokes are provided between the rim and the second hub and hollow airfoil means are supported by each of such spoke pairs. Rim means are provided for holding the spacing and angle of each one of pairs of spokes at the rim, hub means are provided for holding the spacing and angle of each one of the pairs at the second hub, and positioning means hold the spacing and angle of each one of the pairs at a preselected radius intermediate the rim and the second hub. As a further improvement, the invention also provides an electrical generator along with means for cooling the generator. Collecting means concentrate cooling air from the wind and direct it toward the cooling means. Heat due to losses within the generator means is transferred into the cooling air to thus increase the power rating to the generator as a function of wind velocity.

FIG. 3 is an enlarged view of a generator portion of FIG. 2.

FIG. 4 is an enlarged view of a generator portion of FIG. 1 which is an end-on view of FIG. 3 as well.

FIG. 5 is a graph useful in understanding the invention.

Figure 1:
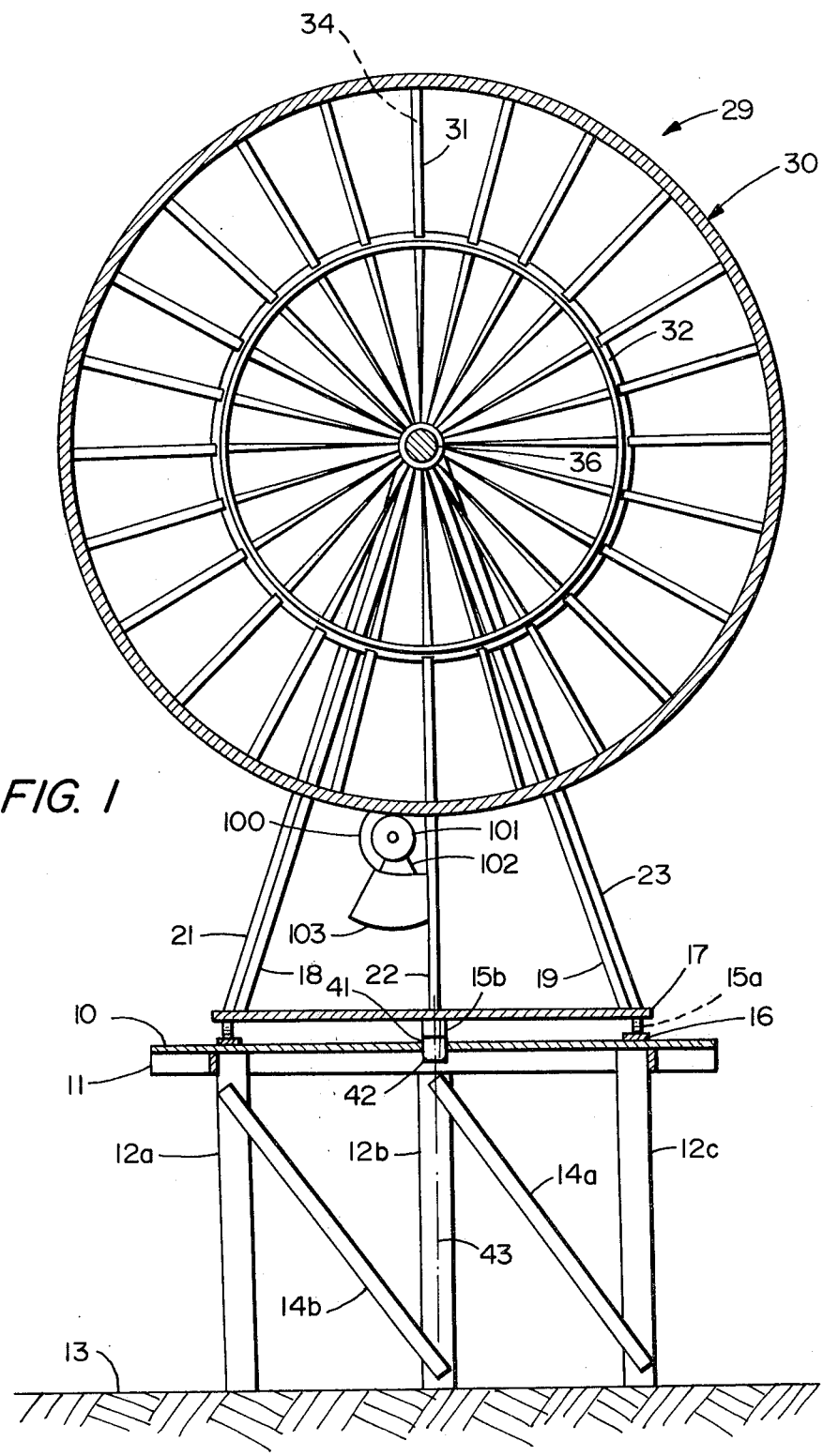
FIG. 1 is a cross-sectional elevational view of a wind turbine system embodying the present invention, looking downwind.

FIG. 1 is a simplified and partial cross-sectional view of the wind turbine of the present invention through the plane of the rim 30 of a turbine wheel 29. A rigid supporting platform or structure for turbine wheel 29 and its rotatable superstructure include a platform 10 supported on floor joists 11 which in turn are supported by poles 12a, 12b and 12c set in the ground 13 and with cross-braces 14a and 14b. Wheel 29 is mounted for rotation on an axle 36 which is supported by a rotatable base structure which includes the tripods 18, 19, 20, 21, 22 and 23 which support the axle 36. The tripods are fixed to a base 17. Base 17 is rotatable about a vertical yaw axis 43 by means of movable casters 15a, 15b, and 15c which run on a fixed circular track 16 fixed on platform 10. On the yaw axis 43 itself there is a bearing 41 mounted on platform 10 and anchored to it by an anchor 42.

The turbine wheel 29 includes a rim 30 which is actually a hollow square extruded aluminum tube rolled to a 6.6 meter diameter. The rim is fastened to its central axis 36 through a pair of hubs 33, 35, better shown in FIG. 2, by tensioned spokes or cables 34. A ring 32, which will be discussed in greater detail below, is a segmented conical strip of metal perforated for the spokes to pass through to control the angle of the airfoils with respect to the plane of the rim of the turbine wheel.

The weight of the wheel 29 is partially supported, as best illustrated in FIG. 1, by an electrical generator 100 having a drive pulley 101 which is in the form of a pneumatic tire, such as an automobile tire and which as illustrated is in frictional contact with rim 30. Since it is located at the underside of the wheel 29 it thus will at least partially support the weight of the wheel.

The generator structure also includes an opening 102 in the housing of the generator 100 to admit cooling air and a wind scoop 103 to collect and concentrate cooling air and direct it into the opening 102. Details of this construction are also shown in FIGS. 3 and 4.

Figure 2:
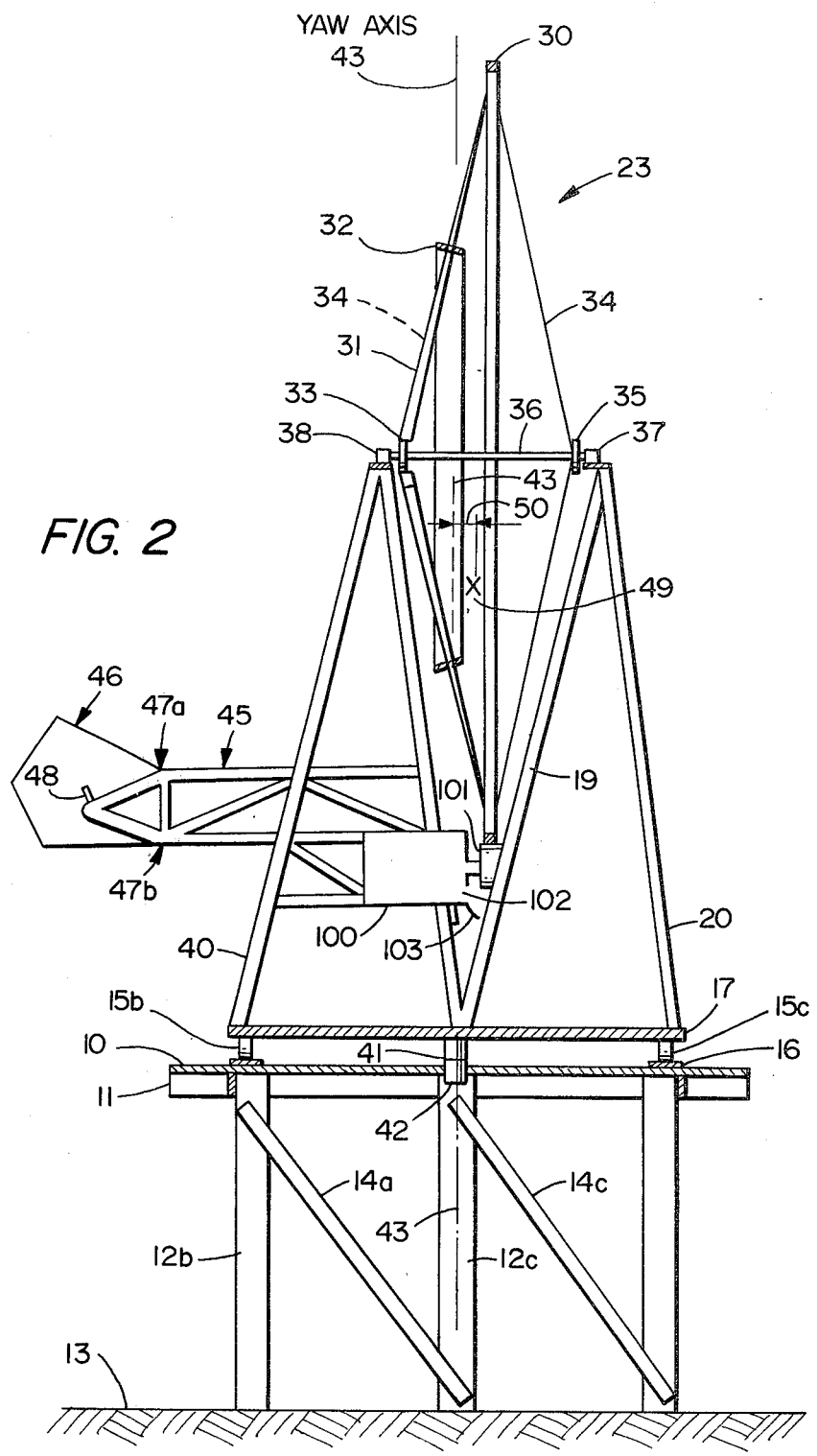
FIG. 2 is a cross-sectional side view of FIG. 1.

Now also referring to FIG. 2, which is a side view of FIG. 1, the construction of wheel 29 is clearer with the spokes 34 in the windward section of the wheel being shown connected between the hub 35 and the rim 30 and the rear spokes between rim 30 and hub 33. In addition each rear spoke pair retains an aluminum sleeve-like airfoil 31. Thus, in effect, a "bicycle" wheel wind turbine has been formed.

Referring briefly to the superstructure of FIG. 2, some elements are shown in FIG. 2 which are now shown in FIG. 1, since FIG. 2 is a side view, such as cross-brace 14c and front tripod 20.

Both hubs 33 and 35 are solidly mounted on axle 36 whose ends are supported by a front axle bearing 37 and a rear axle bearing 38. Front bearing 37 is supported by the tripod 18, 19 and 20 and the rear bearing 38 by a center post 22, left and right tripod legs 21 and 23, and a rear tripod leg 40. As partially discussed above, the two tripods on the base 17 rotate as a single unit on the casters 15a, b, c around the vertical yaw axis 43.

As is illustrated in FIG. 2, the vertical yaw axis 43 passes through the axle or axis line 36 of the wind turbine wheel at a point intermediate the front and rear bearings 37 and 38. Of course, as illustrated in FIG. 1, the axis 43 substantially intersects the axle 36 of the wind turbine wheel 29.

Thus, to express the foregoing in a different way, the yaw axis line 43 passes through a horizontal projection of the airfoils 31 on the axle 36. Of course, the bearings 37, 38 are exterior to both the hubs 33 and 35 and also lie on opposite sides of the projection of the airfoils 31 onto a plane through the axle. Such construction should be compared to the prior art where the yaw axis line always passed outside of the span of the horizontal projection of the airfoils because of the cantilevered design.

Still referring to FIG. 2, to cause the turbine wheel 29 to point into the wind, there is a support boom 45 which holds a vertical tail vane 46 which is hinged about a vertical axis at pivot points 47a and 47b. Wind vane 46 is normally held against the boom 45 by a spring 48.

Normally, the wind vane 46 causes the rotatable support 17 to rotate the wheel 29 so that its axis 36 is facing into the wind.

However, if the wind velocity is too high, for example, greater than 25 miles per hour, then the wind turbine tower rotates about its axis 43 until the wind is parallel to the plane of rim 30. When this occurs, the wind vane 46 will have been pivoted at its points 47a and 47b until it is 90 degrees away from the position shown in the FIG. 2 and the spring 48 is stretched to its maximum length.

The above turning occurs since the composite of all the wind drag forces on the turbine airfoils, the wheel spokes, the wheel rim, the tripod supports, and the other structural members exposed to the wind, produce a torque which is represented by a vector 49 which is an effective virtual point of application, into the drawing page, and the lever arm 50. This force when related to the axis 43 by looking with reference to a top view is a counter clockwise force. On the other hand, the spring 48 acting on the boom 45 produces a second clockwise torque opposite to the first torque which tends to rotate the tower in the opposite direction; in other words, in a direction where the turbine wheel is again facing into the wind.

Specifically, this will occur as the wind velocity diminishes, for example, to less than 25 miles per hour, at which time the first wind drag torque will be less than the other and spring 48 will pull the tower around 90 degrees to face the turbine wheel into the wind. At the instant of starting to move from this stowed position to the running position, the stowing torque due to the drag forces, is equal to (but slightly less than) the restoring torque of the spring. The cost of the spring and the tail can be reduced by making these two torques relatively low. This is achieved in the present invention by making the distance 50 between the axis line 43 and the point 49 of the effective center of drag forces very small, thus reducing the effective radius arm of the drag force. On the other hand, the distance 50 should not be made negative because then the turbine will stay aimed into the wind, and will not stow automatically.

Briefly referring again to the generator 100 shown in FIGS. 1-4, as the turbine rotates the generator can deliver useful electrical power. The power of the wind is proportional to the cube of the wind velocity. At a specified wind velocity, the generator can be delivering its full rated load. The rating is, of course, dependent on its temperature rise. At a higher wind velocity, there is more power available than the generator-rated full load. The generator rating can be increased by providing additional cooling to reduce the generator temperature rise and this is provided by the wind scoop 103 and the generator casing opening 102. Thus, in the present invention, the electrical rating is a monotonic function of the wind velocity and permits the harvesting of additional power at high wind velocity.

FIG. 5 is a plot of airfoil twist, $\theta$, vs. the radius for a desired airfoil angle of attack, $\alpha$, and a desired tip speed ratio. Single curved line 215 represents the theoretical or desired airfoil twist. This starts at 10 degrees at the rim, which is a per unit radius of 1, of course, going through 14 degrees at the 0.55 per unit radius which is at the conical ring 32 and terminating at 23 degrees at the end of the airfoil near the hub, which is at a 0.12 per unit radius. In actual practice, a straight line variation of twist is provided by the two straight line segments 216 and 217 since the spokes are of course straight lines between the hub anchors, the conical ring 32, and the rim. But these two segments are a good approximation of the theoretical curved twist line 215 which would be the ideal airfoil twist angle of attack, $\alpha$.

The desired angle of attack is provided by anchoring each spoke pair in the rim 30 to produce an angle of the airfoil of 10 degrees with respect to the plane of the turbine rim 30. And at the hub 33, a spoke pair is anchored to produce an angle of 23 degrees with respect to this plane. Finally, the ring 32 provides for the twist, $\theta$.

Figure 6:
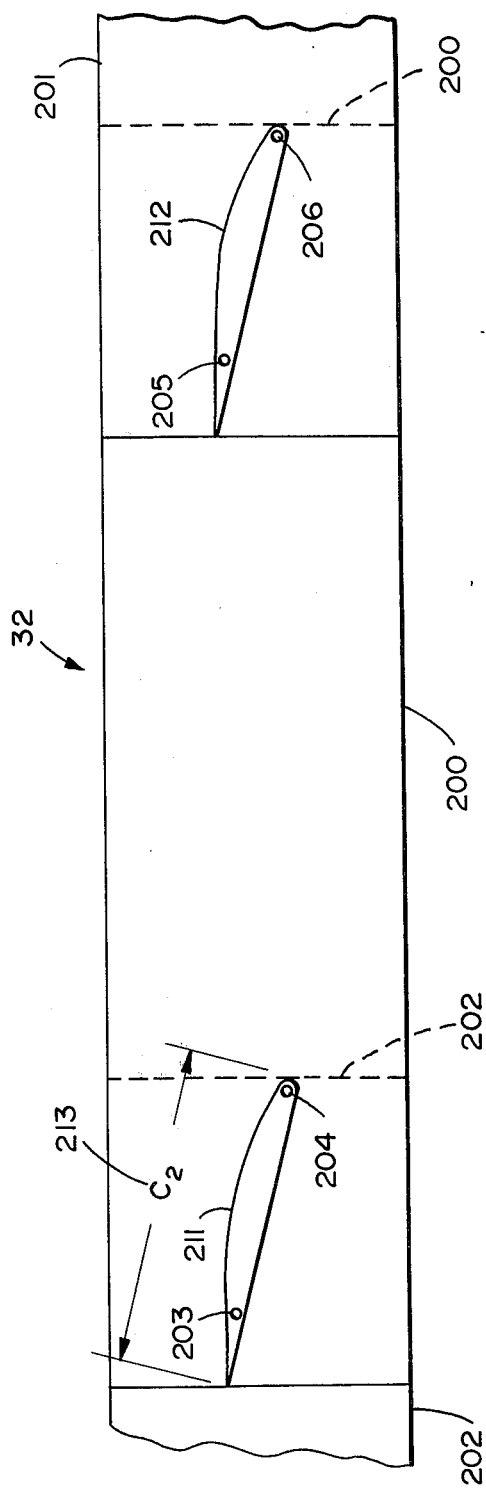
FIG. 6 is the developed appearance of control strips which control the angle of airfoils.

This is illustrated more completely in FIG. 6 where three segments of the segmented ring are shown; namely, 200, 201, and 202. Thus, segments 200 and 202 overlap and provide the holes 203 and 204 through which the spokes will pass. Similarly, segment strips 200 and 201 overlap and provide holes 205 and 206 through which the spokes will pass. A hollow airfoil 211 was threaded over the spokes which were in the holes 203 and 204 and similarly a hollow airfoil 212 is shown in the other location. These airfoils are held at an angle of approximately 14 degrees with respect to the plane of the turbine rim by the spokes in the holes. It might be parenthetically mentioned that if it is desired each alternate strip of conical ring 32 could be eliminated and still maintain an accurate angle. For example strip 200 could be eliminated. If the conical ring 32 had not been used, the airfoil twist at the ring position of 0.55 radius would have been 17 degrees, instead of 14 degrees, which would have been a much less satisfactory airfoil.

The conical ring 32 also provides the function of a microshroud, slightly impeding the radial motion of the windflow due to centrifugal forces and thereby increasing the efficiencies of the airfoils.

Figure 7:
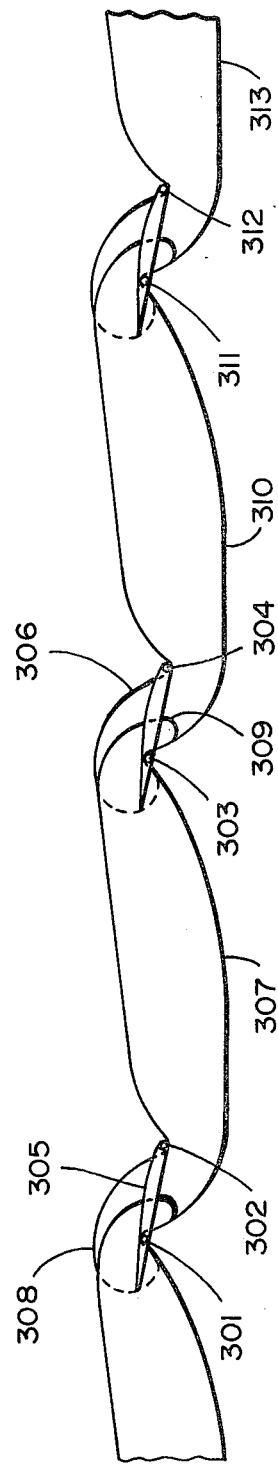
FIG. 7 is an alternative embodiment of FIG. 6.

FIG. 7 shows an alternative embodiment to FIG. 6 which shows links to make the airfoil angles adjustable. Specifically cables 301 through 304 are carrying airfoils 305 and 306. Link 307 is a flat metal strip with a nose 308 that is inserted between the cables or spokes 301 and 302 and rotated counterclockwise to force cable 301 down to the left and cable 302 up to the left. With the cables 301 and 302 in this selected position, tail 309 is hooked over the next adjacent cable 303. The link 307 can be inserted and removed without loosening the cables 301, 302 and 303. In a similar manner a link 310 has been inserted between cables 303 and 304 and the tail of the link hooked around cable 311. Finally link 313 has been inserted between cables 311 and 312. These three links cause the angle of the airfoil with respect to the plane of the turbine wheel to be reduced to a value much less than the value which it would have in the absence of the links and offer an alternative to the segmented strip 32.

Thus, in summary, referring to FIG. 5 and also the angle control of FIG. 6, the angle control of the present invention which involves the conical ring 32 and the ability to place spoked pairs in selected holes in both the rim and in the hub to provide desired angles allows for three different values for the twist angle, $\theta$. And, of course, the twist angle changes gradually between these preselected points.

Figures 8, 9:
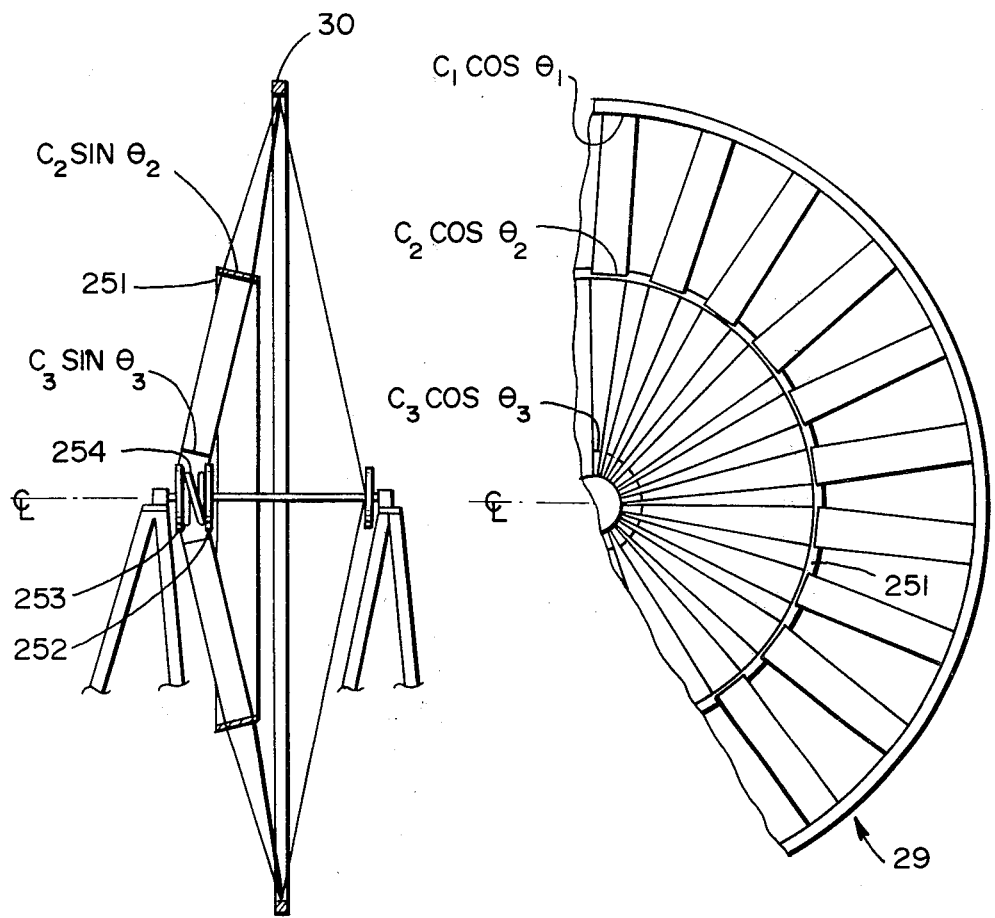
FIG. 8 is a simplified side view of a turbine wheel showing an alternative embodiment of the invention.
FIG. 9 is a partial front view of FIG. 8.

The chord width, c, of the wind turbine may also be made nonconstant as shown in the embodiment of FIGS. 8 and 9. Thus, it is possible to have a chord $C_1$ at the rim, $C_2$ at the conical ring and $C_3$ at the inner end of the airfoils as shown in FIG. 9. Specifically in FIG. 8 at the rim 250 the width $C_1$ will be determined by the spacing of the spoke cable mounting holes in the rim, the spacing between the holes of the conical ring 251 will be consistent with the chord $C_2$ and a single hub provides some leeway in adjustment. However, in accordance with the present invention, if it is desired to provide a greater range of adjustment, in addition to a second hub 252 there is provided a third hub 253 which is also mounted on the shaft. Separating these hubs is a spring 254. With this adjustment changes in the design can be provided for optimizing for different wind spectra. In the specific embodiment of FIG. 8 the spring permits the movement of one hub with respect to another in response to wind thrust forces to provide a variable angle of twist of the airfoil.

Thus an improved wind turbine has been provided. What is claimed is:

1. A wind turbine system comprising:
    a turbine wheel with a substantially horizontal axle and including an exterior rim and airfoils mounted between said rim and said axle;
    a pair of axle bearings for supporting said wheel for rotation when acted upon by the wind, said bearings lying on the opposite sides of the projection of said airfoils onto a plane through said axle, one of said axle bearings being designated the upwind bearing and the other of said axle bearings being designated the downwind bearing;
    a rigid structure; and
    a supporting base rotatable on said rigid structure around a vertical yaw axis for supporting said pair of axle bearings so that said vertical yaw axis passes through a horizontal plane through said horizontal axle substantially between said pair of axle bearings and so that said vertical yaw axis passes between the plane of said rim and another plane through said downwind bearing parallel to the plane of said rim, with a significant distance between said vertical yaw axis and said plane of said rim.

2. A system as in claim 1 including electric generator means having a housing and a drive pulley extending therefrom and means for causing the drive pulley to engage said rim at its bottom portion so that rotation of said turbine wheel by the wind will rotate said generator pulley and so that said drive pulley will partially support the weight of said turbine wheel.

3. A system as in claim 2 where said pulley includes a pneumatic tire which frictionally engages said rim.

4. A system as in claim 2 where said housing includes an air scoop for cooling said generator which faces toward the wind below said rim and outside of the swept area of the turbine wheel and parallel to said horizontal wheel axis.

5. A system as in claim 1 where said rotatable support base includes a wind vane for rotating said base so that the turbine wheel axis normally points into the wind in a running position, said vane producing a first torque around said vertical yaw axis in one direction of rotation, said turbine wheel itself along with other structural members of said supporting base producing a second wind drag torque opposite said one direction to tend to cause rotation of said support base to a stowed position where said turbine wheel axle is substantially perpendicular to the wind direction, said second torque being greater than said first torque when the wind exceeds a predetermined velocity whereby said base rotates to a stowed position.

6. A system as in claim 5 including means for resiliently mounting said wind vane to pivot about a vertical axis so that resultant resilient forces will provide an effective torque in said one direction to move said base to said running position.

7. A system as in claim 6 where said resilient mounting means include a spring.

8. A wind turbine system as in claim 1 where said axle includes hubs, and including flexible tensioned spokes between the rim and a first hub, pairs of flexible tensioned spokes between the said rim and a second hub, rim means for holding the spacing and angle of each one of said pairs of spokes at said rim, hub means for holding the spacing and angle of each one of said pairs at said second hub, positioning means for holding the spacing and angle of each one of said pairs at a preselected radius intermediate between said rim and said second hub, and hollow airfoil means supported by each of said pairs.

9. A wind turbine system as in claim 8 including a third hub, resilient coupling means positioning said third hub with respect to said second hub, one spoke of said pair of spokes being anchored on said second hub and the other spoke of said pair of spokes being anchored on said third hub, whereby changes in the wind forces on said airfoil means cause said coupling means to change the position of said third hub with respect to said second hub to vary the twist of said airfoil means.

10. A system as in claim 8 where said positioning means is an overlapping segmented conical ring through which said spokes and airfoil means pass.

11. A system as in claim 8 where said airfoil means have a preselected non-constant chord width.

12. A system as in claim 8 where said rim means provides a first preselected angle for said airfoil means near said rim, said positioning means provides a second and different said angle and said hub provides a third and different said angle for said airfoil means.

* * * * *